United States Patent [19]
Schmitt

[11] 3,861,656
[45] Jan. 21, 1975

[54] VERTICAL MIXER
[75] Inventor: Armin Schmitt, Heusenstamm, Germany
[73] Assignee: Maschinenfabrik J. S. Petzholdt, Frankfurt/M, Germany
[22] Filed: Mar. 8, 1973
[21] Appl. No.: 339,107

[30] Foreign Application Priority Data
Apr. 27, 1972 Germany.......................... 2220679

[52] U.S. Cl................................. 259/118, 99/348
[51] Int. Cl............................................... B01f 7/08
[58] Field of Search .......... 259/102, 118, 119, 120, 259/116, 103, 104; 99/348

[56] References Cited
UNITED STATES PATENTS
2,719,703  10/1955  Boakes............................. 259/118
3,248,091  4/1966  Hock................................. 259/104
3,482,823  12/1969  Rechtin............................. 259/102

*Primary Examiner*—Robert W. Jenkins
*Attorney, Agent, or Firm*—Kurt Kelman

[57] ABSTRACT

A mixing vessel with a vertical axis has a plurality of rotatable screw conveyors extending vertically through the top of the vessel into its mixing chamber and a stirrer arranged revolvably about the vessel axis to sweep over the wall of the mixing chamber as it revolves. The stirrer is so associated with the screw conveyors that it moves a mass to be mixed in the chamber towards the screw conveyor means, and may be constituted by one of the screw conveyors.

6 Claims, 3 Drawing Figures

Patented Jan. 21, 1975 3,861,656
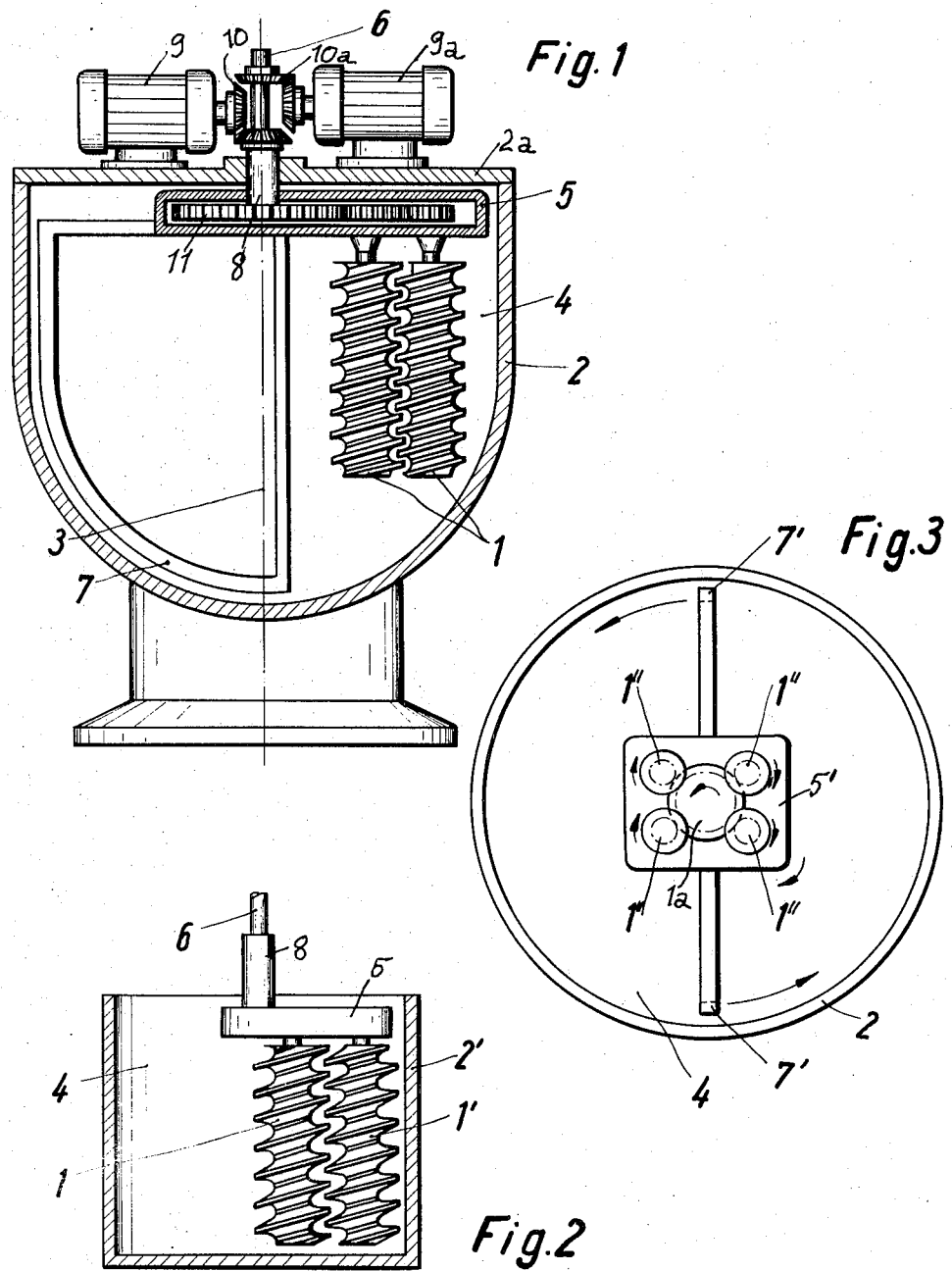

VERTICAL MIXER

The present invention relates to improvements in a mixer which comprises a mixing vessel having a vertical axis and defining an interior mixing chamber wherein batches of a mass of particles, such as chocolate, may be mixed, homogenized and emulsified.

It is known to provide such mixing vessel with rotatable screw conveyor means extending vertically from the vessel top into the mixing chamber. Mixers of this type are shown, for instance, in German Auslegeschrift No. 1,116,195, German Offenlegungsschrift No. 1,935,443 and U.S. Pat. No. 3,482,823.

Such mixers have the disadvantage, if they can be used at all with difficult masses, such as mentioned above, that the threads of the screw conveyors are easily clogged until mixing finally becomes altogether impossible because the threads are partially or completely filled to the point of ineffectiveness. In this condition, the rotation of the screw conveyors in relation to the mass merely cuts a channel into the mass and only those particles are mixed which may happen to fall into this channel.

German Offenlegungsschrift No. 1,935,443 unsatisfactorily attempts to solve this problem by permitting a screw conveyor in a conical mixing chamber to effectuate a radial movement in respect of the mixing chamber axis. In addition to its functional shortcomings, this arrangement also involves complex gearing.

It is an object of this invention to overcome these disadvantages and to provide a mixer of the generally indicated type wherein use is made of the good mixing capacity of rotatable screw conveyors and wherein this capacity is improved by so arranging the screw conveyors that, on the one hand, they move the mass constantly upwardly and continuously re-work it as it tumbles down again under the force of gravity while, on the other hand, the arrangement permits such masses as chocolate particles, which are very difficult to handle, to be readily homogenized in a simple structure which forces all articles to be moved into, and worked by, the screw conveyors.

The above and other objects are accomplished in accordance with the broadest aspect of the invention a rotatable screw conveyor means comprising at least two interdigitating rotatable screw conveyors mounted for rotation in opposite directions, combined with a stirrer arranged revolvably about the vessel axis in the mixing chamber. The stirrer is adapted to sweep over the wall of the mixing chamber as it revolves about the vessel axis and is associated with the rotatable screw conveyor means so as to move a mass to be mixed in the chamber towards the screw conveyor means. The stirrer may be one of the screw conveyors.

While interdigitating screw conveyors, which engage either fully or with some play therebetween are known, for instance, from German Auslegeschriften Nos. 1,163,780, 1,180,718 and 1,214,605, these are used in continuously operating kneading, mixing or conveying apparatus requiring the arrangement of the screw conveyors in housings which closely surround the conveyors so that the masses are forced to move within the conveyor cavities to obtain the result desired by this type of apparatus.

German Auslegeschrift No. 1,062,001 describes a mixer with interdigitating screw conveyors for working synthetic resin masses. This is a mixer with a horizontal axis and the conveyors move along the wall of the mixing chamber. The screw conveyors are so arranged that they alternately move into and out of the mass which, therefore, does not move under the force of gravity during the mixing operation.

The mixing effect may be usefully varied by different arrangements of the screw conveyors which may, for instance, be mounted in pairs and concentrically or eccentrically in respect of the vessel axis. They may be revolvable in respect of the vessel axis, and the screw conveyors as well as the stirrer may be driven in the same or opposite directions.

In one embodiment, the stirrer is constituted by one of the screw conveyors and, to make certain that all the particles of the mass are siezed, the diameter of the mixing chamber is at least equal to the sum of the diameters of the screw conveyors less the approximate height of the thread of one conveyor, the screw conveyors being arranged in a radial plane in respect of the vessel axis.

The above and other objects, advantages and features of the present invention will become more apparent from the following detailed description of certain now preferred embodiments thereof, taken in conjunction with the accompanying drawing wherein:

FIG. 1 shows an elevational side view, partly in section, of one embodiment of the mixer according to this invention;

FIG. 2 is a side view, partly in section, of the essential parts of another embodiment; and FIG. 3 is a top view of yet another embodiment.

Referring now to the drawing and first to FIG. 1, there is shown a mixing vessel or kettle 2 closed by cover 2a. Drive shaft 8 is journaled for rotation about axis 3 of the vessel in cover 2a, the drive shaft having support 5 affixed thereto for rotation therewith. A motor 9 is mounted on cover 2a and drives bevel gearing 10 interposed between the output axle of the motor and drive shaft 8 to rotate the shaft about axis 3.

Support 5 has affixed thereto a mixing paddle or stirrer 7 extending to one side of axis 3 and a pair of screw conveyors 1, 1 at the diammetrically opposite side of the axis, the stirrer and screw conveyors being eccentrically arranged in interior 4 of the mixing vessel 2.

A three-gear train 11 is housed within a cavity in support 5, a drive shaft 6 extending through an axial bore in shaft 8 and connected to the largest one of the gears for driving the pair of smaller gears which, in turn, rotate the screw conveyors, the smaller gears being connected to the axles of the conveyors. A second motor 9a is mounted on cover 2a and drives bevel gearing 10a interposed between the output axle of motor 9a and drive shaft 6.

In operation and with both motors running, the stirrer 7 and the pair of screw conveyors 1, 1 will revolve in the interior of the mixing vessel about the vessel axis 3, the stirrer sweeping over the wall of kettle 2 while the screw conveyors will simultaneously rotate about their own axis.

If desired, the mixing vessel may be open on top and drive shafts 8 and 6, with their drive motors, may be supported on a base above the vessel and spaced therefrom. Also, as will be seen in the embodiment of FIG. 2, the mixing vessel may have any desired shape.

The embodiment of FIG. 2 is quite similar to that of FIG. 1, except that it dispenses with the mixing paddle and used one of the screw conveyors 1' as the stirrer which sweeps over the wall of cylindrical mixing vessel 2'. The screw conveyors 1, 1' are arranged in a radial plane passing through the vessel axis and the relative dimensions of the diameter of interior 4 of the vessel and the combined diameters of the conveyors are such that the interior diameter is at least equal to the combined diameters of the conveyors less approximately the height of the thread of one conveyor. This dimensioning will make certain that the pair of counter-rotating and interdigitating screw conveyors will engage and mix all particles of the mass in the interior of the vessel as the conveyors revolve around the vessel axis. During the revolution of the conveyors, the two rotating conveyors move into and through the mass of particles along a wide face, as does the stirrer in FIG. 1, and none of the particles of the mass can escape being gripped by the rotating conveyors. Thus, the stirrer 7 and the dimensioning of the conveyor pair in FIG. 2 make certain of a thorough mixing of the mass by the screw conveyors by continuously collapsing any channel formations in the mass.

In the embodiment of FIG. 3, support 5', which is rotatable about the axis of mixing vessel 2, carries a pair of mixing paddles 7', 7' extending across the interior 4 of the vessel in a diametrical plane passing through the vessel axis and four screw conveyors 1" arranged concentrically about this axis on either side of the mixing paddles and interdigitating with a central screw conveyor 1a extending along the vessel axis and rotating with support 5'. The dirve arrangement is similar to that in FIG. 1 and, as shown by the arrows, the screw conveyors 1" are rotated in a direction opposite to the direction of rotation of support 5' and mixing paddles 7'.

In all embodiments, a very simple structure assures a very thorough mixing of a mass of particles in the interior of the vessel by continuously forcing all the particles to move up and down in the vessel while avoiding any channel formation in the mass during the mixing phase wherein the mass is not yet fluid. At the same time, the screw conveyors are self-cleaning.

I claim:
1. A mixer for a chocolate mass comprising
   1. a mixing vessel having a vertical axis and defining an interior mixing chamber, the mixing vessel having a top,
   2. a rotatable screw conveyor means extending vertically from the vessel top into the mixing chamber, the screw conveyor means comprising at least two interdigitating rotatable screw conveyors mounted for rotation in opposite directions, and
   3. a stirrer arranged revolvably about the vessel axis in the mixing chamber, the stirrer extending in a radial plane and having an edge portion adapted to sweep over the wall of the mixing chamber as it revolves about the vessel axis and being associated with the rotatable screw conveyor means so as to move the chocolate mass in the chamber towards the screw conveyor means.
2. The mixer of claim 1, wherein the screw conveyors are eccentrically mounted in respect of the vessel axis.
3. The mixer of claim 2, wherein the screw conveyors are arranged in a radial plane extending through the vessel axis, the stirrer extending in another radial plane.
4. The mixer of claim 1, wherein the rotatable screw conveyor means is arranged revolvably about the mixing vessel axis.
5. the mixer of claim 1, wherein the stirrer is one of the rotatable screw conveyors, the combined diameters of the screw conveyors being such that the diameter of the interior mixing chamber is, at least, twice the combined diameters of the conveyors less approximately the height of the thread of one of the conveyors, and the screw conveyors are arranged in a radial plane in respect of the vessel axis.
6. The mixer of claim 1, wherein the screw conveyor means comprises a plurality of rotatable screw conveyors arranged symmetrically and concentrically about the vertical axis of the mixing vessel.

* * * * *